UNITED STATES PATENT OFFICE

2,017,004

SULPHURIC ACID DERIVATIVE OF ORGANIC SULPHUR COMPOUNDS

Alfred Kirstahler, Dusseldorf, and Wilhelm Jakob Kaiser, Dusseldorf-Benrath, Germany, assignors to the firm Henkel & Cie. Gesellschaft mit beschrankter Haftung, Dusseldorf, Germany No Drawing. Application October 25, 1933, Serial No. 695,214. In Germany November 18, 1932

6 Claims. (Cl. 260—99.12)

We have found that a new class of valuable organic compounds may be obtained if organic sulphides, which contain a higher aliphatic or cycloaliphatic residue and reactive groups (that is to say, double bonds, hydroxyl groups or aryl groups), are reacted with oxygen-liberating per-compounds, and the products oxidized at the sulphur are treated with sulphating agents.

In carrying out the process, for example, organic sulphides which are substituted in one of the residues by at least one hydroxyl group may be treated with oxygen-liberating per-compounds, and the sulphones thus obtained of the general formula

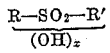

(R signifying a higher aliphatic or cycloaliphatic alkyl residue, and R' any other residue) may be reacted further with sulphating agents.

The starting substances which come more particularly into consideration are organic sulphides or sulphide mixtures which are substituted in at least one of the residues by other reactive groups. Such substituents are for example the double bond or the hydroxyl or aryl group.

The higher aliphatic or cycloaliphatic residues are residues containing at least 8 carbon atoms in the molecule.

The reaction of the sulphides with the oxygen-liberating per-compounds is carried out in known manner, sulphoxides or sulphones or mixture of these substances being produced according to the reaction conditions.

Sulphation may be carried out with the usual sulphating agents such as concentrated sulphuric acid, sulphuric acid containing $SO_3$, sulphuric acid anhydride, chlorsulphonic acid or the products of the addition of $SO_3$ to tertiary bases and the like, and the operation may be carried out in the presence or absence of solvents or diluents.

The new compounds possess emulsifying and saponaceous properties so that they may be employed for example as soap substitutes. They are suitable inter alia for the manufacture of dentifrices, shaving preparations, hair washes and the like.

A particular technical advantage of our process is the fact that, by the reaction with oxygen-liberating per-compounds the unpleasant odor often inherent in sulphides is completely eliminated, and that the new compounds obtained are more reactive than the corresponding sulphides employed as starting substances.

Examples 1. 27.6 parts by weight of dodecyl-($\beta$-$\gamma$-dihydroxy-propyl)—sulphide of the formula

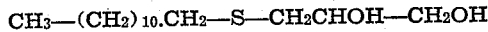

are dissolved in 80 parts by volume of glacial acetic acid, and 24 parts by weight of concentrated (30 per cent.) hydrogen peroxide are gradually added thereto, a rise in temperature above 35° C. being prevented by suitable cooling. After being allowed to stand for some time at room temperature, the product is worked up in the usual manner. The oxidation product, which presumably is dodecyl-($\beta$-$\gamma$-dihydroxy-propyl)-sulphone, is obtained as a white crystalline mass.

7.7 parts by weight of this sulphone are dispersed as finely as possible in about 75 parts by volume of carbon tetrachloride. Into this liquid, 2.9 parts by weight of chlorsulphonic acid are then introduced in drops, while stirring, at 0° to 5° C., and stirring is continued for some time at 10 to 15° C. to complete the reaction. After neutralizing with sodium carbonate or alcoholic caustic soda solution, the liquid is evaporated to dryness in a vacuum. The resulting sodium salt of the sulphation product dissolves in water to form a clear solution. The aqueous solution has strong lathering or foam-producing properties.

In the same way, the sulphation products of the corresponding decyl, tetradecyl and hexadecyl sulphone may be prepared, and also those of the analogous sulphones which contain for example the $\beta$-hydroxyethyl residue instead of ($\beta$-$\gamma$-dihydroxy-propyl) residue.

By mixing 7 parts of the new compounds with a mixture of 28 parts of carragee mucilage (1:19) and 35 parts of pure glycerol, with the application of heat, and stirring this mixture with 30 parts of precipitated calcium carbonate, an excellent toothpaste is obtained which if desired can be perfumed with peppermint oil and menthol.

2. 82.8 parts by weight of a mixture of sulphides which contain, on the one hand, the normal aliphatic alkyl residues of 8, 10, 12, 14 and 16 carbon atoms and, on the other hand, the ($\beta$-$\gamma$-dihydroxypropyl)-residue (mean molecular weight 276), are dissolved in 240 parts by volume of glacial acetic acid, and 72 parts by weight of concentrated hydrogen peroxide are added as described in Example 1. After being allowed to stand for some time at room temperature, the product is worked up in the usual manner. The resulting oxidation product of the sulphide mixture is a white, crystalline mass.

7.7 parts by weight of the resulting sulphone mixture of dodecyl-($\beta$-$\gamma$-dihydroxypropyl)-sulphone and the corresponding octyl, decyl, tetradecyl and hexadecyl sulphones are introduced into 20 to 25 parts by weight of concentrated sulphuric acid cooled to 0° C. Thereupon, the mixture is carefully heated to 30° C. while stirring and finally is stirred for about another hour at 10° to 15° C. The mixture is then poured on ice and the excess of sulphuric acid is removed. The sulphation product is then neutralized with caustic soda solution and the sodium salt is salted out, filtered off and dried.

The sulphated product obtained in the foregoing manner is readily soluble in water. It has very good lathering or foam-producing properties and possesses very good stability in regard to lime.

An aqueous 10 per cent. solution of the new compound obtained, if desired after suitable perfuming, may be employed for example as an excellent hair wash.

3. 39 parts by weight of a mixture of β-hydroxy-ethyl-naphthenyl-sulphides are dissolved in 150 parts by weight of glacial acetic acid and 11.5 parts by weight of concentrated hydrogen peroxide are slowly added, while well stirring, the temperature being not allowed to exceed 35° C. After allowing the reaction mixture to stand for some time, much water is added at about 20° C. The oil which separates out is purified by washing with water and a dilute solution of sodium carbonate. The oxidation product of the sulphide is a clear, yellow, somewhat viscous oil.

One part by weight of the oxidation mixture obtained is introduced, in small portions, while well stirring and cooling with ice water, into 3 parts by weight of concentrated sulphuric acid. The temperature is thereupon slowly raised to 50° C. until a test portion dissolves in water. The reaction liquid is neutralized by the addition of sodium bicarbonate. The sodium salt of the sulphation product, which can be separated from the inorganic salts by means of hot alcohol, is a slightly reddish yellow-colored oil which dissolves in water to form an almost clear solution, and the solutions of which possess good lathering or foam-producing properties.

4. 32 parts by weight of ethyl oleyl sulphide are mixed with 150 parts by weight of glacial acetic acid while stirring and then 11.5 parts by weight of concentrated hydrogen peroxide are added, thorough stirring being continued, so that the temperature does not exceed 35° C. After allowing the reaction mixture to stand for some time much water is added at about 20° C. The oil which separates out is purified by washing with water and a dilute solution of sodium carbonate. At room temperature it is a white, viscous mass.

7 parts by weight of the resulting ethyl-oleyl sulphone of the formula $C_2H_5$—$SO_2$—$CH_2(CH_2)_7.CH=CH(CH_2)_7$—$CH_3$ are dissolved in 50 parts by volume of ether and treated with 13 parts by weight of chlorsulphonic acid at 20° C. until a neutralized test portion, after distilling off the ether, is soluble in water. After neutralizing with sodium bicarbonate and filtering off from insoluble matter, the ether is distilled off. The reddish yellow oily residue dissolves in water to form an almost clear solution. The aqueous solution possesses strong lathering or foam-producing properties.

We claim:—

1. The process for the manufacture of sulphuric acid derivatives of organic sulphur compounds, which comprises reacting an organic sulphide of the general formula R.S.R' in which formula R means an organic radical selected from the group consisting of aliphatic and cycloaliphatic radicals having at least 8 carbon atoms and in which R' means a lower aliphatic alkyl radical and which sulphide is substituted by at least one reactive group selected from the group consisting of double bonds and hydroxyl radicals, with oxygen-liberating per-compounds, and reacting the products oxidized at the sulphur atom with sulphating agents.

2. The process for the manufacture of sulphuric acid derivatives of organic sulphur compounds, which comprises reacting an organic sulphide of the general formula R.S.R' in which formula R means an organic radical selected from the group consisting of aliphatic and cycloaliphatic radicals having at least 8 carbon atoms and which is substituted by double bonds, and in which formula R' means a lower aliphatic alkyl radical, with oxygen-liberating per-compounds, and reacting the product which is oxidized at the sulphur atom with sulphating agents.

3. The process for the manufacture of sulphuric acid derivatives of organic sulphur compounds, which comprises reacting an organic sulphide of the general formula R.S.R' in which formula R means an organic radical selected from the group consisting of aliphatic and cycloaliphatic radicals having at least 8 carbon atoms and in which R' means a lower aliphatic alkyl radical which is substituted by at least one hydroxyl group, with oxygen-liberating per-compounds, and reacting the products oxidized at the sulphur atom with sulphating agents.

4. The process for the manufacture of sulphuric acid derivatives of organic sulphides which comprises reacting an organic sulphide of the general formula R.S.R' in which formula R means an organic radical selected from the group consisting of aliphatic and cycloaliphatic radicals having at least 8 carbon atoms and in which R' means a lower aliphatic alkyl radical, which sulphide is substituted in one of the radicals by at least one hydroxyl group, with oxygen-liberating per-compounds, and reacting the resulting sulphone of the general formula $$\underset{(OH)_x}{R-SO_2-R'}$$

(R signifying a higher aliphatic or cycloaliphatic radical and R' a lower aliphatic alkyl radical) with sulphating agents.

5. The process for the manufacture of sulphuric acid derivatives of organic sulphides which comprises reacting a mixture of organic sulphides of the general formula R.S.R' in which formula R means an organic radical selected from the group consisting of aliphatic and cycloaliphatic radicals having at least 8 carbon atoms and which are substituted by at least one hydroxyl group and in which formula R' means a lower aliphatic alkyl radical, with oxygen-liberating per-compounds, and reacting the resulting mixture of sulphones with a sulphating agent.

6. The sulphation product of an organic sulphone corresponding to the general formula R—$SO_2$—R', in which R denotes an organic radical selected from the group consisting of aliphatic and cycloaliphatic radicals having at least 8 carbon atoms, R' denotes a lower aliphatic alkyl radical, and which sulphone is substituted in one of the radicals by a reactive group selected from the group consisting of double bonds and hydroxyl radicals.

ALFRED KIRSTAHLER.
WILHELM JAKOB KAISER.